(12) United States Patent
Hegde et al.

(10) Patent No.: US 9,081,806 B2
(45) Date of Patent: Jul. 14, 2015

(54) AUTOMATED DATABASE ARCHIVING

(75) Inventors: Sumanth Hegde, Bangalore (IN); Santosh Vijayan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/606,028

(22) Filed: Sep. 7, 2012

(65) Prior Publication Data
US 2014/0074792 A1   Mar. 13, 2014

(51) Int. Cl.
G06F 17/30   (2006.01)

(52) U.S. Cl.
CPC ................................ G06F 17/30306 (2013.01)

(58) Field of Classification Search
CPC ................................ G06F 17/30; G06F 17/00
See application file for complete search history.

(56) References Cited

U.S. PATENT DOCUMENTS

| | | | |
|---|---|---|---|
| 6,161,097 A * | 12/2000 | Glass et al. | 705/6 |
| 6,278,965 B1 * | 8/2001 | Glass et al. | 703/22 |
| 6,587,127 B1 * | 7/2003 | Leeke et al. | 715/765 |
| 6,604,115 B1 * | 8/2003 | Gary et al. | 1/1 |
| 7,287,048 B2 * | 10/2007 | Bourbonnais et al. | 1/1 |
| 8,176,015 B1 * | 5/2012 | Somerville | 707/661 |
| 8,818,961 B1 * | 8/2014 | Beatty et al. | 707/685 |
| 2002/0049815 A1 * | 4/2002 | Dattatri | 709/206 |
| 2005/0015411 A1 * | 1/2005 | Altman | 707/200 |
| 2005/0149584 A1 * | 7/2005 | Bourbonnais et al. | 707/204 |
| 2005/0203887 A1 * | 9/2005 | Joshi et al. | 707/3 |
| 2006/0294122 A1 * | 12/2006 | Altman | 707/100 |
| 2008/0015889 A1 * | 1/2008 | Fenster | 705/1 |
| 2008/0065974 A1 * | 3/2008 | Campbell | 715/200 |
| 2008/0066080 A1 * | 3/2008 | Campbell | 719/314 |
| 2008/0294697 A1 * | 11/2008 | Andrasak et al. | 707/200 |
| 2009/0187612 A1 * | 7/2009 | Kaijima et al. | 707/204 |
| 2010/0088284 A1 * | 4/2010 | Cina | 707/665 |
| 2011/0178990 A1 * | 7/2011 | Ohkawa | 707/662 |
| 2013/0080411 A1 * | 3/2013 | Rolia et al. | 707/694 |
| 2013/0080536 A1 * | 3/2013 | Rolia et al. | 709/204 |
| 2014/0006356 A1 * | 1/2014 | Held | 707/667 |
| 2014/0032600 A1 * | 1/2014 | Sarferaz et al. | 707/781 |

FOREIGN PATENT DOCUMENTS

WO    WO2012008951 A1   1/2012

OTHER PUBLICATIONS

SAP AG; Network Graphic (SAP Library—Data Archiving (CA-ARC)); Accessed on Sep. 6, 2012; p. No. 1; SAP AG, Walldorf, Germany; (http://help.sap.com/SAPHELP_NW04s/helpdata/EN/8d/3e4e33462a11d189000000e8323d3a/content.htm).
SAP AG; The Archiving Object PM_PLAN (PM-PRM-TL); Accessed on Sep. 6, 2012; p. No. 1-2 ;SAP AG, Walldorr, Germany; (http://help.sap.com/saphelp_40b/helpdata/en/8d/3e63dc462a11d189000000e8323d3a/frameset.htm).

(Continued)

*Primary Examiner* — Farhan Syed

(57) ABSTRACT

Various embodiments of systems and methods of optimizing a database are described herein. Database tables are rated based on at least one of table size and table growth rate. One or more of the database tables are then selected based on the rating of the database tables. Archiving objects for the one or more selected tables are obtained. An archiving object includes one or more archiving programs and defines data related to a business object. The archiving objects are ranked based on dependencies between them. Based on the ranking of the archiving objects, an archiving schedule including an archiving order for the archiving objects is generated. The archiving schedule is then displayed.

15 Claims, 10 Drawing Sheets

(56) References Cited

OTHER PUBLICATIONS

Helmut Stefani; Archiving Your SAP Data—A comprehensive guide to plan and execute archiving projects; 2007; p. No. 1-40; SAP AG, Walldorf, Germany; (http://www.sap-press.de/download/dateien/362/sap_press_archiving_sap_data.pdf).

Helmut Stefani; Archiving Your SAP Data; Chapter-5; 2003; p. 159-199; SAP Press; SAP AG; Waldorf; Germany.

Helmut Stefani; Archiving Your SAP Data; Chapter-6; 2003; p. 201-251; SAP Press; SAP AG; Waldorf; Germany.

Helmut Stefani; Archiving Your SAP Data; Chapter-7; 2003; p. 253-305; SAP Press; SAP AG; Waidorf; Germany.

* cited by examiner

AUTOMATED DATABASE ARCHIVING

BACKGROUND

Data in some systems such as enterprise systems can grow at a rapid pace. The underlying database tables that store the data can become very large. Performance of a system is typically dependent on the size of database tables. Large database tables make operations such as searching and reading slower, resulting in decreased productivity. Therefore, some data records from database tables are moved to a storage system to increase productivity. This process of moving data records from a database table to a storage system is called archiving. Data records for archiving are identified based on various parameters. For example, data records that do not need to be accessed frequently can be selected for archiving. However, different systems can have different volumes of data. Therefore, manual analysis of data is typically required to determine an optimal archiving schedule. Such manual analysis can be time consuming and inefficient. For example, if data usage pattern changes, then a new analysis needs to be performed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for automated database optimization are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
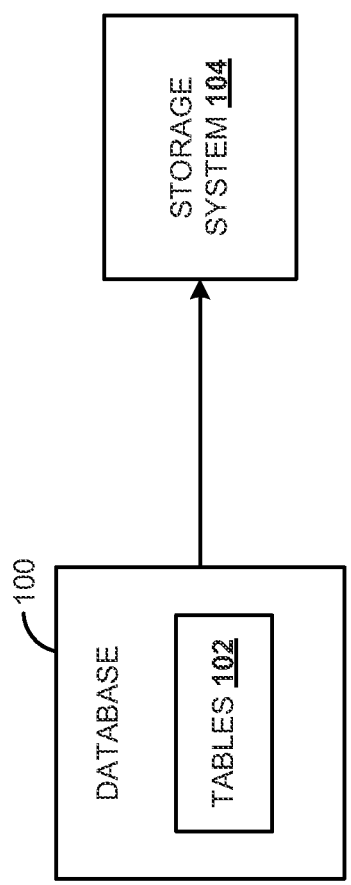
FIG. 1 is a block diagram illustrating a database and a storage system for archiving, according to one embodiment.

Referring to FIG. 1, data in a database 100 is stored in tables 102. The database tables 102 are frequently updated as a result of various operations. Data records in the database table 102 may be changed or new data records can be added to the database tables 102. There can be numerous operations that require updating of database tables 102. For example, there can be several user activities during any single day that require updating of organizational databases, leading to rapid growth in data. The storage capacity of the database 100 can be overwhelmed by such rapid growth of data. Therefore, data in the database 100 is archived by moving some data records of the database tables 102 to a storage system 104. This will free up memory resources of the database 100. However, this process of archiving is manual in nature. A user has to manually perform an analysis to identify tables that need to be archived. This analysis can be tedious, time consuming, and prone to errors.

Figure 2:
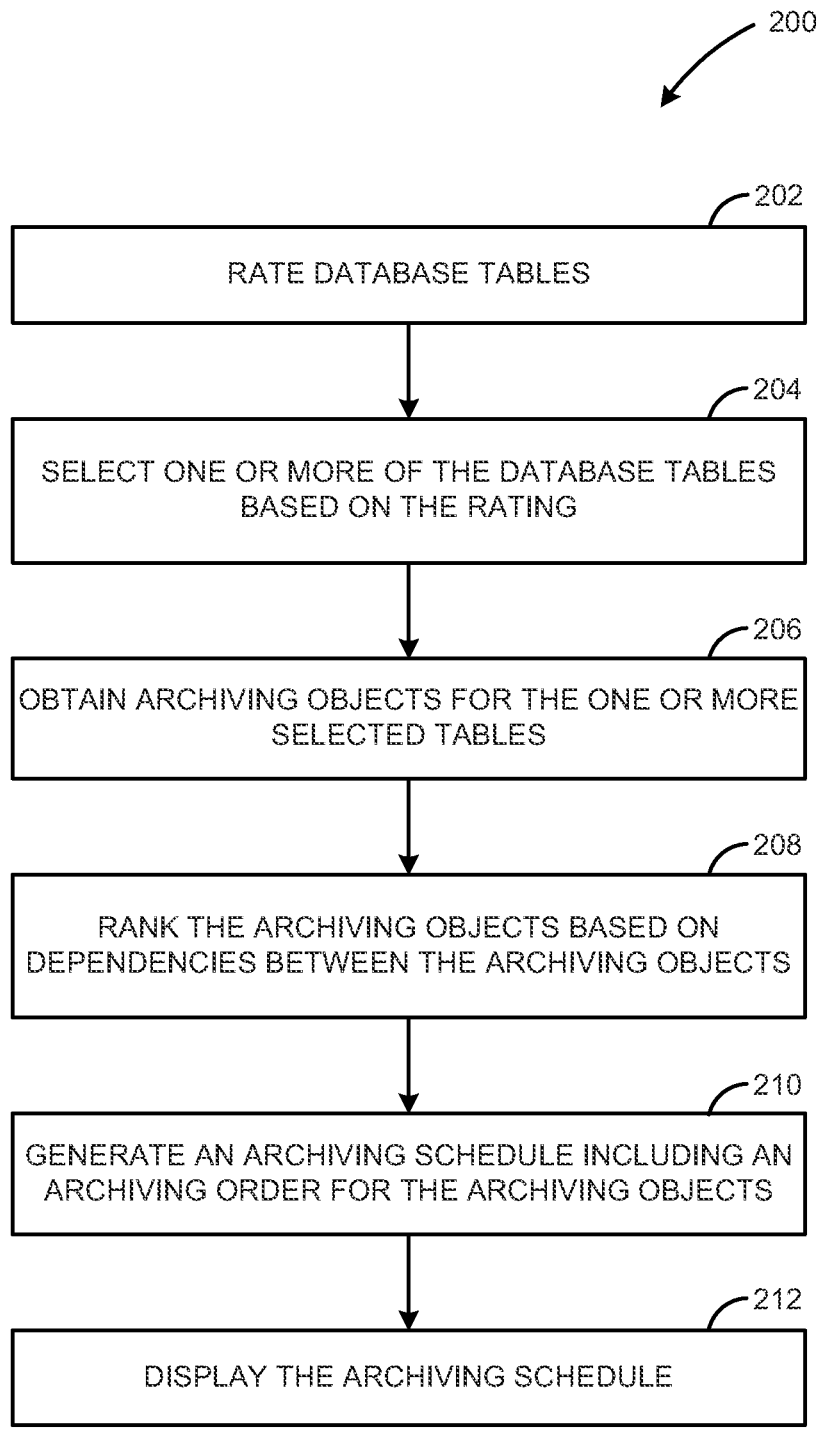
FIG. 2 is a block diagram illustrating a method of automated database optimization, according to one embodiment.
Figure 3:
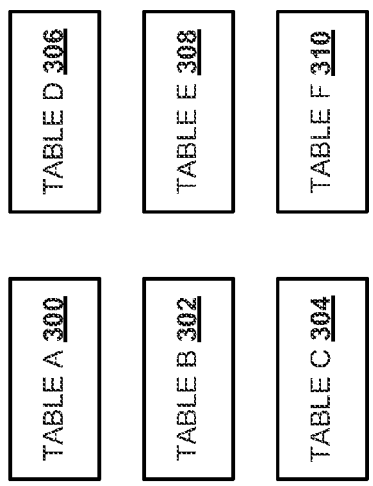
FIG. 3 is a block diagram illustrating database tables for rating, according to one embodiment.

FIG. 2 illustrates an embodiment of a method 200 of automated database optimization. At 202, database tables are automatically rated based on parameters such as table size and table growth rate. As an example, consider that the tables 300-310 shown in FIG. 3 belong to one or more databases. Each of these tables is rated based on respective table sizes and table growth rates. In one embodiment, as part of the rating, a composite rating is determined for each table. The composite rating can be a function of the table size and table growth rate. Table size can be the total number of data records of a table. Table growth rate indicates the number of data records added in a specific period of time. For example, table growth rate can be an average number of data records added during a single day. The composite rating for a table can be defined as following:

$$\text{Composite rating} = \text{Number of data records} + \text{Table growth rate}$$

In one embodiment, a weightage can be given to table size and table growth rate. This weightage can be customizable and can be selected based on archiving needs of an organization. In one embodiment, the table growth rate can be given more weight than the table size. For example, the table growth rate can be given sixty percent weightage and the table size can be given forty percent weightage. Weightage-based composite rating for a table can be defined as following:

$$\text{Composite rating} = (0.4)(\text{Number of data records}) + (0.6)(\text{Table growth rate})$$

The tables can have different number of data records and different growth rates. As an example, table A 300 can have thousand records and a growth rate of fifty records per day on average and table B 302 can have ten thousand records and a growth rate of ten records per day on average. Therefore, different tables have different composite ratings. A higher composite rating means that the table size and/or growth rate is high. Therefore, tables with higher composite ratings are good candidates for archiving.

Referring back to FIG. 2, at 204, tables with relatively higher composite ratings are selected for archiving. In one embodiment, a threshold value of the composite rating is used for selecting the tables. The threshold values can be an average value of the composite ratings, a median value of the composite ratings, an upper quartile of the composite ratings, or other percentile value of the composite ratings. In another embodiment, top few tables having a higher composite rating are selecting. For example, these top tables can be the tables having composite ratings in the upper quartile of the overall composite ratings. In this way, some of the database tables are selected. As an example, consider that table B 302 and table D 306 (FIG. 3) are selected.

At 206, archiving objects for the selected database tables (e.g., tables B and D) are obtained. An archiving object is a logical unit that describes which data from the database makes up a business object. A portion of data from one or more database tables is related to a business object. The archiving object defines this portion of data as related to a particular business object. A business object is a software entity representing real-world items used during the transaction of business. For example, a business object may represent a business document such as a sales order, a purchase order, or an invoice. A business object may also represent items such as a product, a business partner, or a piece of equipment. A business object may include business logic and/or data having any suitable structure. The structure of a business object may be determined based on the requirements of a business scenario in which the business object is to be deployed.

Figure 4:
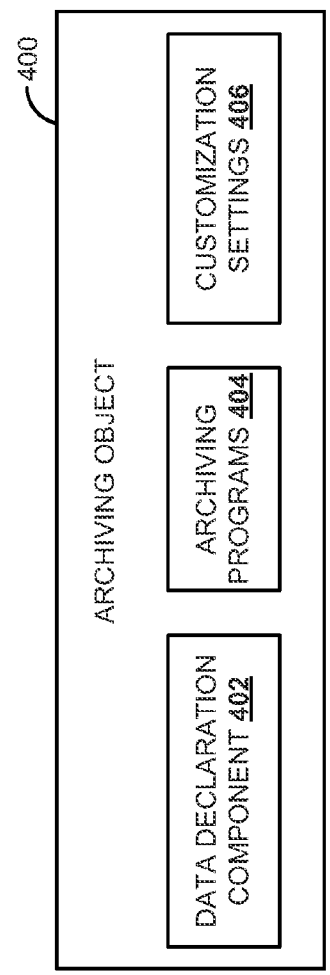
FIG. 4 is a block diagram illustrating an archiving object, according to one embodiment.

The archiving object also includes archiving programs such as a write program to write business objects to archive files, a delete program to delete business objects from the database after archiving, and a read program to display an archived business object. In one embodiment as shown in FIG. 4, the archiving object 400 includes a data declaration component 402, archiving programs 404, and customization settings 406. The data declaration component 402 is used to define the data related to a business object 406. In addition to write, read, and delete programs, the archiving programs 404 can also include a preprocessing program that prepares data for archiving, a post-processing program to process data after archiving, and a reload program to reload the archived business objects into the database. The customization settings 406 are used to define parameters specific to archiving object for an archiving session.

Each database table can have one or more archiving objects associated with it. In one embodiment, archiving metadata can be stored in the database. The archiving metadata can be stored in a table and include information about which archiving objects are associated with which database tables. Therefore, archiving metadata tables can be used to obtain a list of archiving objects for the selected database tables.

Figure 5:
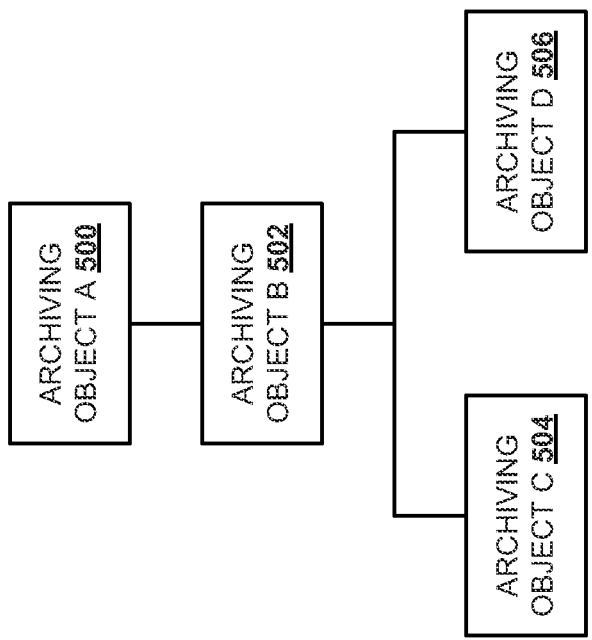
FIG. 5 is a block diagram illustrating archiving objects for the selected tables, according to one embodiment.

FIG. 5 illustrates a list of archiving objects 500-506 for the selected tables (e.g. table B and table D). In one embodiment, relations between database tables are captured by the archiving objects. For example, consider that a sales order item table is selected after rating and a sales order header table is not selected because of a lower composite rating. The sales order item table and the sales order header table are related. The archiving object for the sales order item table is obtained from the archiving metadata table. This archiving object captures the relation between the sales order item table and the sales order header table.

Archiving objects have dependencies between them. For example, the archiving object C 504 depends from archiving object B 502, which in turn depends on archiving object A 500. The archiving object D 506 also depends on archiving object B 502. A dependency between two archiving objects specifies which archiving object is to be run before the other. In an archiving process, the write program of an archiving object is executed. The write program creates archive files. Following which, the delete program of the archiving object is executed to delete the data that had been written into archive files. The archive files are then stored. By running a parent archiving object before a child archiving object, data integrity is maintained.

Referring back to FIG. 2, at 208, the archiving objects are ranked based on dependencies between them. The root archiving object is ranked as the first archiving object that needs to be run, following which a subsequent archiving object in the dependency chain. Considering the example of FIG. 5, the archiving object A 500 is given a first rank, the archiving object B 502 is given a second rank, the archiving object C 504 is given a third rank. Since the archiving object D 506 is also dependent on the archiving object B 502, the archiving object D 506 can also be given a third rank and the archiving processes for both the archiving objects C 504 and archiving object D 506 can be executed in parallel. In one embodiment, one or more of the obtained archiving objects may not be dependent on other archiving objects. In this case, the archiving process for such non-dependent archiving objects can be run in parallel along with archiving processes of other archiving objects. In another embodiment, archiving process of a non-dependent archiving object is run in parallel with archiving process of a top ranked archiving object belonging to an archiving object dependency chain.

Referring back to FIG. 2, at 210, an archiving schedule is generated based on the ranking of the archiving objects. The archiving schedule provides an order of execution of archiving process based on the rankings of the archiving objects. Archiving object-specific archiving processes such as writing and deleting are executed for each archiving object as per the order in the archiving schedule. The archiving objects are arranged from a top or high ranking archiving object to a lowest ranking archiving object. Considering the archiving objects of FIG. 5, the archiving schedule includes the following order of archiving objects: (1) archiving object A 500, (2) archiving object B 502, and (3) archiving object C 504. Therefore, archiving processes for the archiving object A 500 are executed first, followed by archiving processes for the archiving object B 502, and archiving processes for the archiving object C 504. The archiving object D 506 can also be ranked third and the archiving processes for archiving object D can be executed in parallel with archiving processes for the archiving object C.

Figure 6:
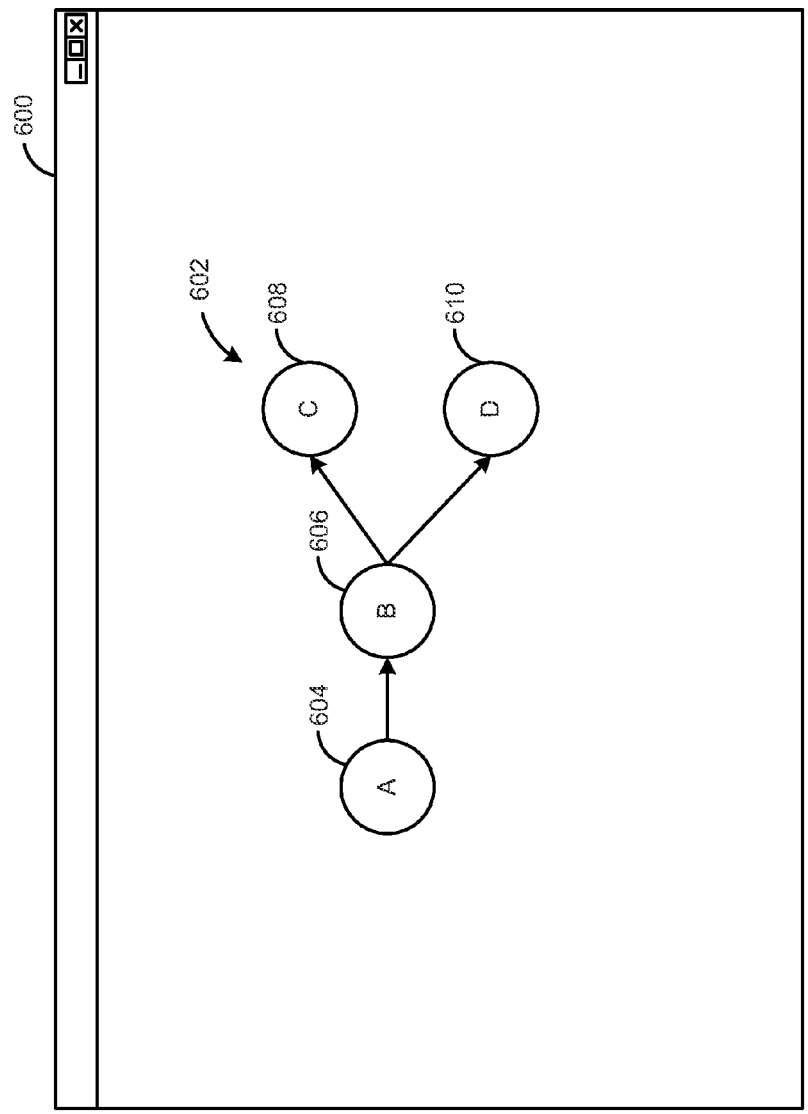
FIG. 6 is a block diagram of a user interface displaying archiving schedule, according to one embodiment.
Figure 7:
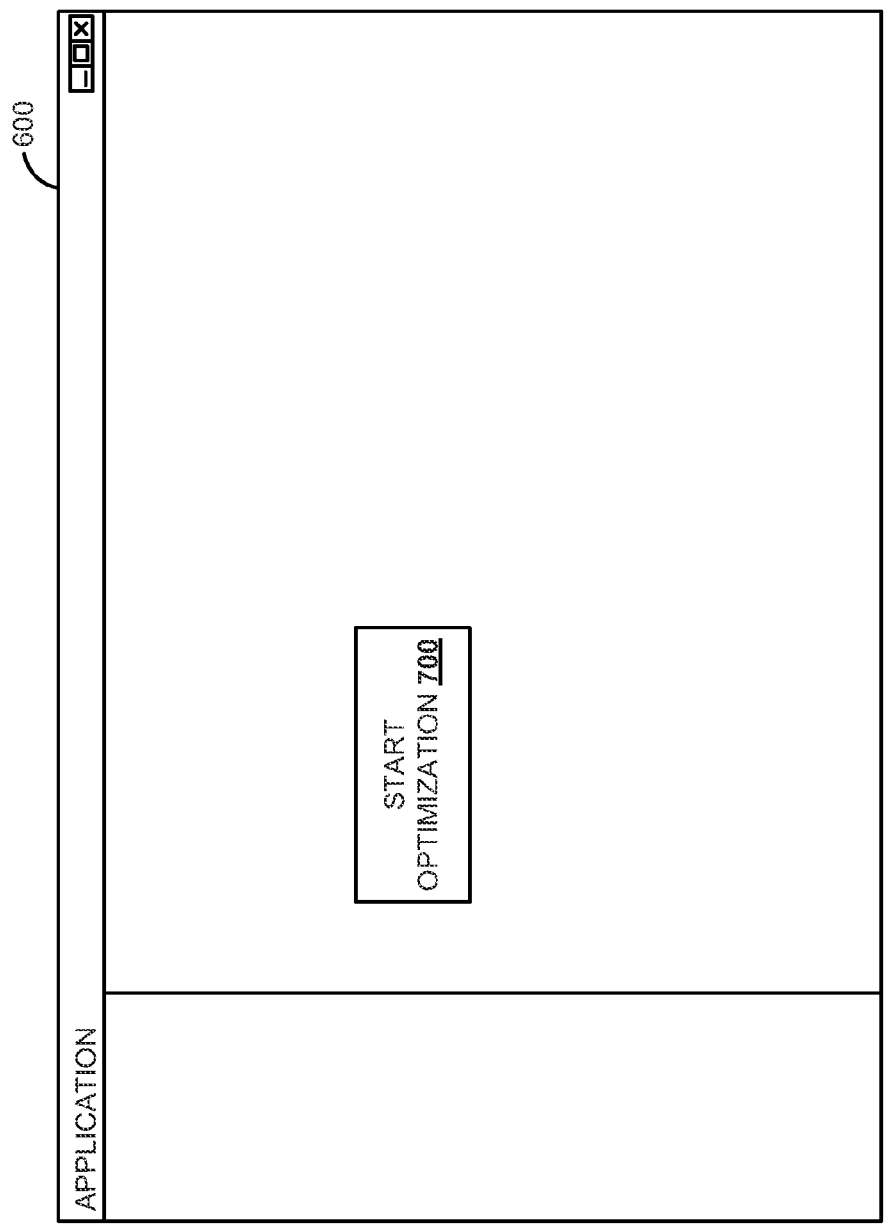
FIG. 7 is a block diagram of a user interface of an application embodying the method of automated database optimization, according to one embodiment.

Referring back to FIG. 2, at 212, the archiving schedule is displayed on a user interface. FIG. 6 illustrates an embodiment of the user interface 600. The archiving schedule 602 displayed on the user interface provides an overview to a user. The archiving objects and their order can be presented using various graphical techniques. For example, graphical representations of the archiving objects can be presented in a hierarchy to represent their order, with archiving object A 604 as the root component, archiving object B 606 depending from archiving object A 604, archiving object C 608 depending from archiving object B 606, and archiving object D 610 also depending from archiving object B 606. In one embodiment, the user interface 600 can be integrated with the method 200. The user interface 600 can be part of an application embodying the method 200. As shown in FIG. 7, an authorized user can access the application and initiate the method 200 using an option 700 on the user interface 600. The method 200 is then automatically executed and the archiving schedule is provided as the output and displayed on the user interface 600. Therefore, the user can readily know the order of the archiving objects, without the need to perform any manual analysis to generate an archiving schedule.

A user has to just initiate the method via the user interface 600 to optimize a database. The archiving processes are then executed for each archiving object as per the order in the archiving schedule. This frees up memory resources of the database as some of the data from the database is moved to a storage system as part of the archiving process. Therefore, the database is optimized for better performance and operations such as reading data from the database, searching the database, etc., run faster.

Figure 8:
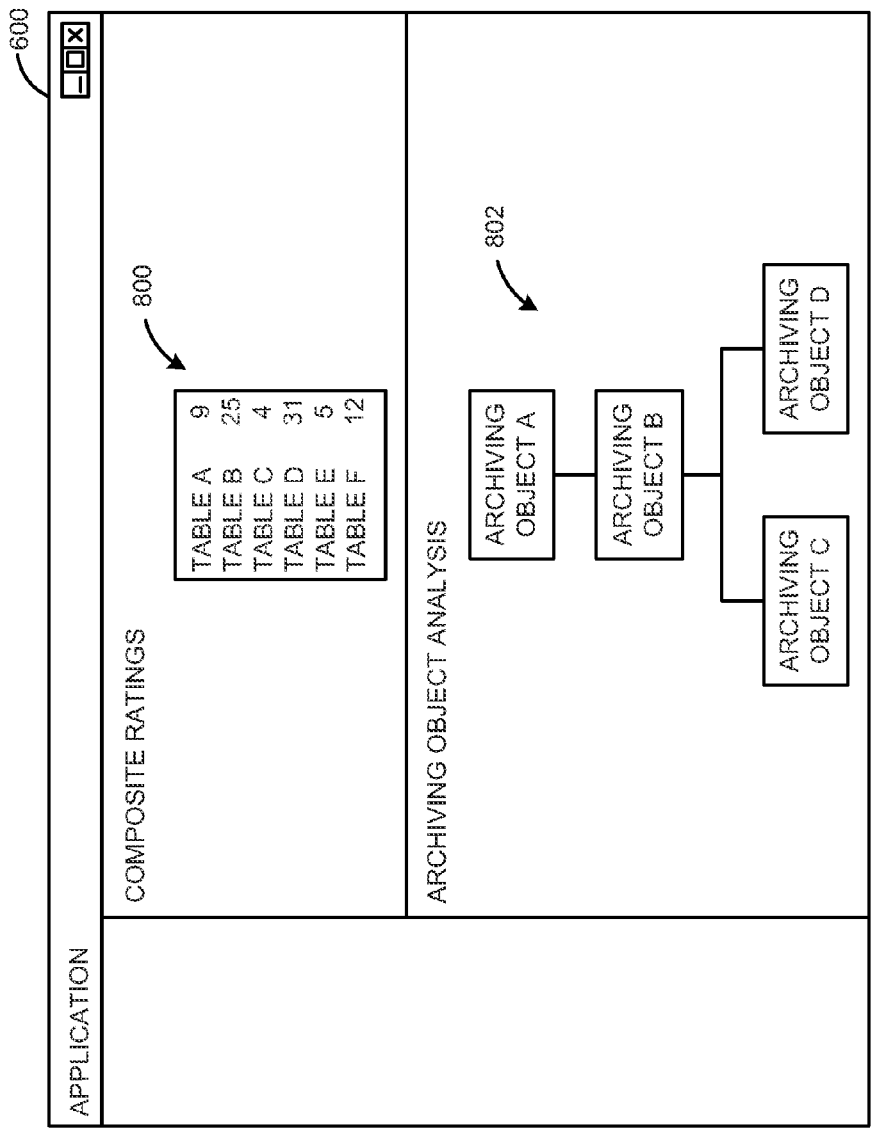
FIG. 8 is a block diagram of a user interface displaying composite ratings for database tables and analysis of archiving objects, according to one embodiment.

In one embodiment, the user interface 600 displays intermediate results during database optimization. For example, as shown in FIG. 8, the user interface 600 can display composite ratings 800 of the selected database tables. This provides an overview of database tables that are involved in archiving process. The user interface can also display results of archiving object analysis 802 such as the archiving objects for the selected tables and the dependencies between the archiving objects.

Figure 9:
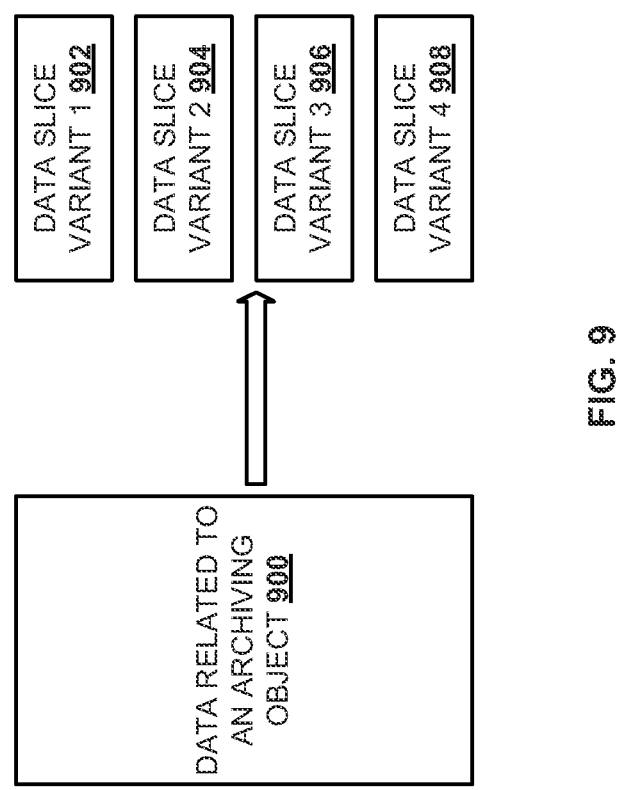
FIG. 9 is a block diagram illustrating data slice variants, according to one embodiment.

Referring to FIG. 9, each archiving object is associated with a portion of data 900 in the database. This portion of data 900 can be large. Therefore, in one embodiment, this portion of data 900 is divided into a plurality data slice variants 902-908 based on one or more attributes. The attribute can be a generic attribute such as sales order type, fiscal year, quarter, etc., such that the data slice variants are mutually exclusive. For example, the portion of data related to an archiving object can be sales data for the year 2010 and the data slice variants can include a first data slice variant 902 for sales data of the first quarter of 2010, a second data slice variant 904 for sales data of second quarter of 2010, a third data slice variant 906 for sales data of third quarter of 2010, and a fourth data slice variant 908 for sales data of fourth quarter of 2010.

Figure 10:
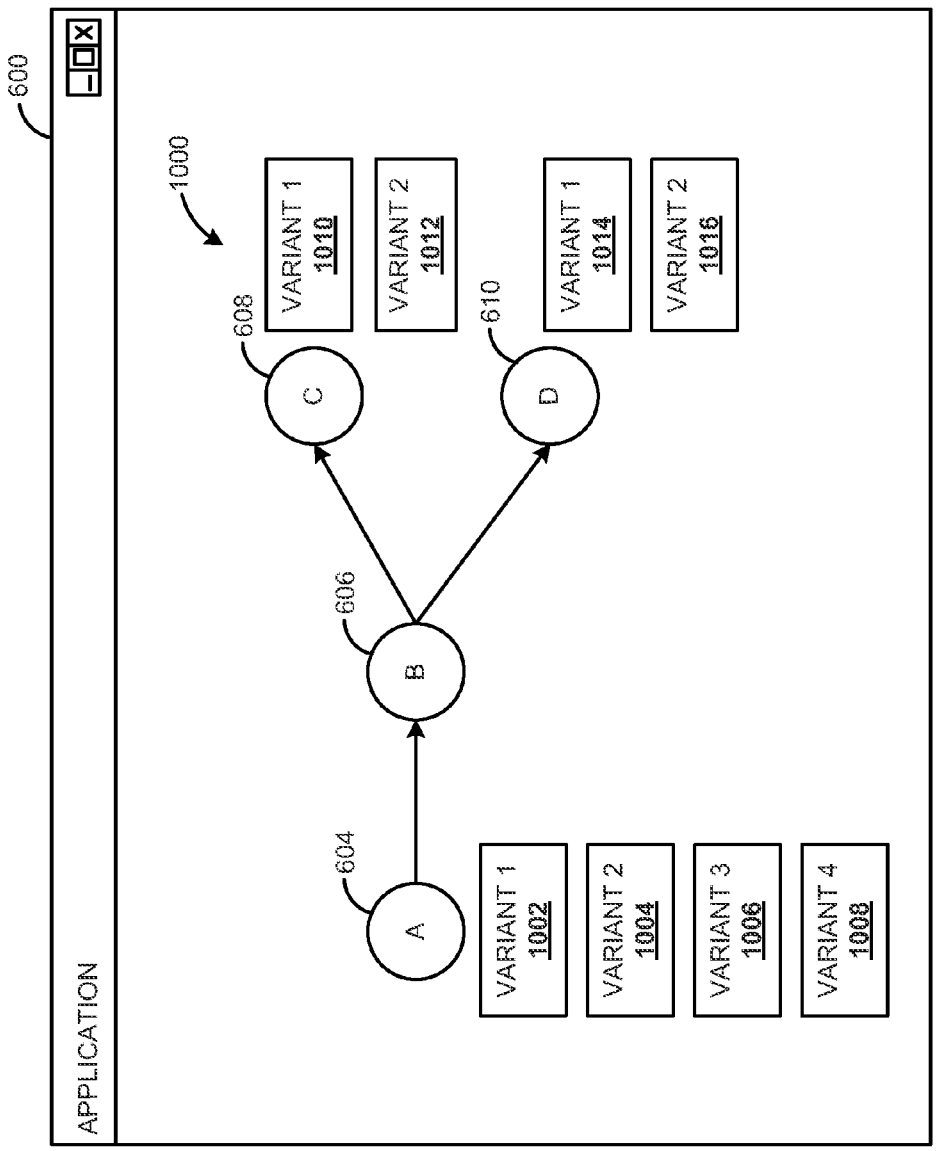
FIG. 10 is a block diagram of a user interface displaying archiving schedule comprising variants for archiving objects, according to one embodiment.

In one embodiment, in addition to order of the archiving objects, the archiving schedule includes data slice variants for the archiving objects. This archiving schedule 1000 is also displayed on the user interface 600, as shown in FIG. 10. For example, the archiving object A 604 includes four data slice variants 1002-1008, the archiving object B 606 does not include any data slice variants, the archiving object C 608 includes two data slice variants 1010 and 1012, and the archiving object D 610 includes two data slice variants 1014 and 1016. A predefined set of attributes can be used to automatically determine the data slice variants for an archiving object. If one of these predefined attributes is associated with data related to an archiving object, then data slice variants are automatically determined for that archiving object. Depending on these attributes, some archiving objects may not have data slice variants. For an archiving object, archiving processes can be executed in parallel for the data slice variants. This will speed up the archiving process. For example, for the archiving object A, write and delete operations can be executed in parallel for the four data slice variants 1002-1008 since there is no overlap of data between the data slice variants 1002-1008.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
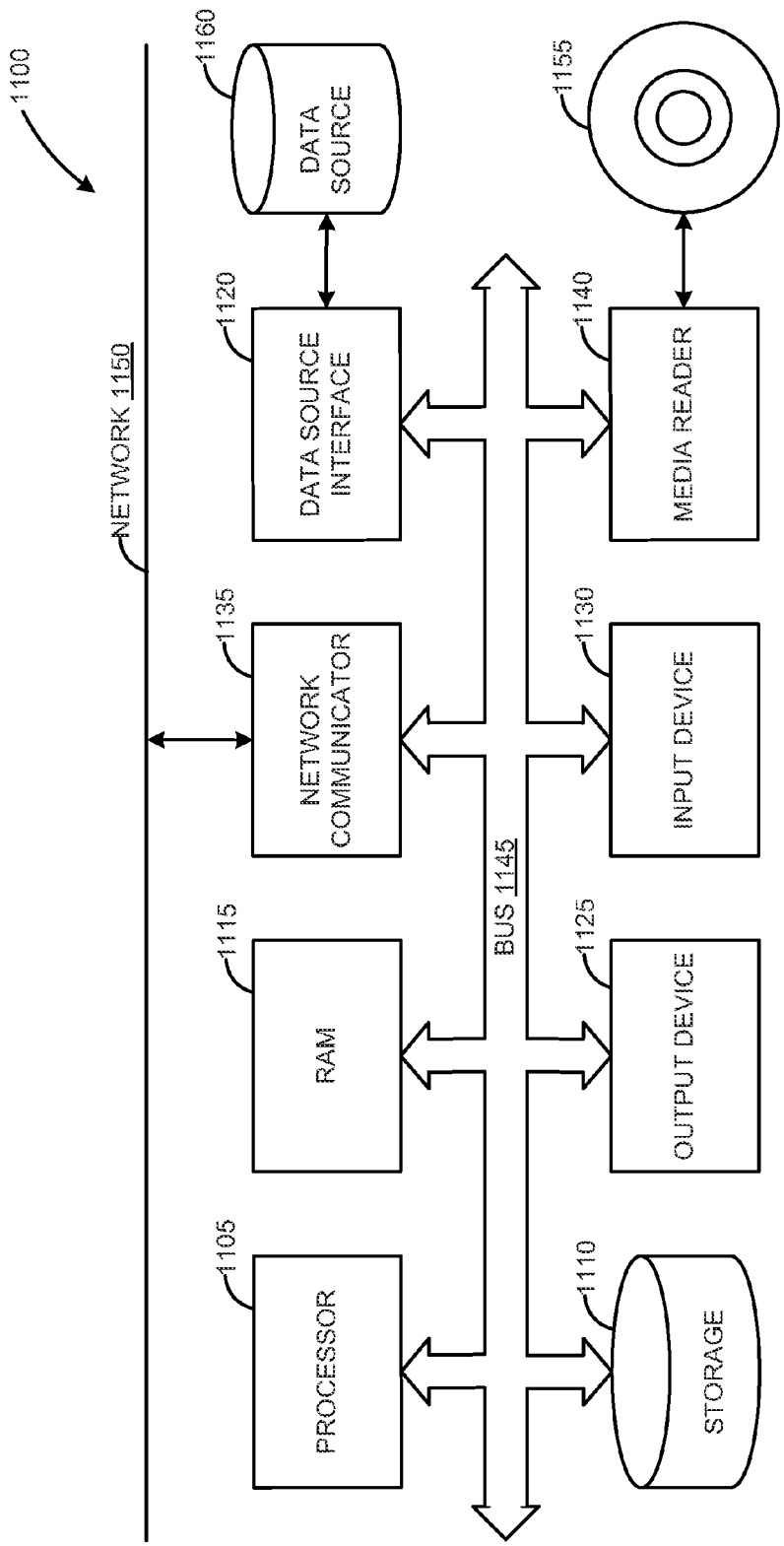
FIG. 11 is a block diagram of an exemplary computer system according to one embodiment.

FIG. 11 is a block diagram of an exemplary computer system 1100. The computer system 1100 includes a processor 1105 that executes software instructions or code stored on a computer readable storage medium 1155 to perform the above-illustrated methods. The processor 905 can include a plurality of cores. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, all of the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer readable storage medium to tangibly store instructions, which when executed by a computer, cause the computer to:
    rate a plurality of database tables based on at least one of one or more parameters including a table size and a table growth rate;
    receive a selection of one or more database tables from the plurality of database tables based on the rating;
    obtain a plurality of archiving objects associated with the one or more selected database tables, wherein the plurality of archiving objects include one or more archiving programs and define data related to a business object;
    receive a selection of one or more data slice variants associated with the plurality of the archiving objects based on an attribute, wherein the one or more data slice variants associated with at least two archiving objects from the plurality of archiving objects are mutually exclusive;
    rank the plurality of archiving objects based on dependencies between the plurality of archiving objects;
    based on the ranking of the plurality of archiving objects, generate an archiving schedule including an archiving order and one or more data slice variants associated with the plurality of archiving objects; and
    display the archiving schedule on a user interface.

2. The non-transitory computer readable storage medium of claim 1, wherein the instructions to rate the plurality of database tables based on the at least one of one or more parameters including the table size and the table growth rate, further comprises instructions to: determine a composite rating for one or more of the plurality of database tables based on the table size and the table growth rate.

3. The non-transitory computer readable storage medium of claim 2, wherein the instructions to select the one or more database tables based on the rating of the plurality of database tables, further comprises instructions to: select the one or more database tables based on a threshold value of the composite rating.

4. The non-transitory computer readable storage medium of claim 3, further comprising instructions which when executed by the computer, further causes the computer to: display the composite rating and the dependencies between the plurality of archiving objects on a user interface.

5. The article of manufacture of claim 1, further comprising instructions which when executed by the computer, further causes the computer to: execute archiving processes according to the archiving schedule.

6. A computer-implemented method to generate an archiving schedule for a database, the method comprising:
    rating a plurality of database tables based on at least one of one or more parameters including a table size and a table growth rate;
    receiving a selection of one or more database tables from the plurality of database tables based on the rating;
    obtaining a plurality of archiving objects associated with the one or more selected database tables, wherein the plurality of archiving objects include one or more archiving programs and define data related to a business object;
    receiving a selection of one or more data slice variants associated with the plurality of the archiving objects based on an attribute, wherein the one or more data slice variants associated with at least two archiving objects from the plurality of archiving objects are mutually exclusive;
    ranking the plurality of archiving objects based on dependencies between the plurality of archiving objects;

based on the ranking of the plurality of archiving objects, generating an archiving schedule including an archiving order and one or more data slice variants associated with the plurality of archiving objects; and displaying the archiving schedule on a computer generated user interface.

7. The computer-implemented method of claim 6, wherein rating the plurality of database tables based on the at least one of one or more parameters including the table size and the table growth rate, further comprising: determining a composite rating for one or more of the plurality of database tables based on the table size and the table growth rate.

8. The computer-implemented method of claim 7, wherein selecting the one or more database tables based on the rating of the plurality of database tables, further comprises: selecting the one or more database tables based on a threshold value of the composite rating.

9. The computer-implemented method of claim 8, further comprising: displaying the composite rating and the dependencies between the plurality of archiving objects on a user interface.

10. The computer-implemented method of claim 6, further comprising: execute archiving processes according to the archiving schedule.

11. A computer system to generate an archiving schedule for a database, comprising:

a computer memory to store program code; and a processor to execute the program code to:

rate a plurality of database tables based on at least one of one or more parameters including a table size and a table growth rate;

receive a selection of one or more database tables from the plurality of database tables based on the rating;

obtain a plurality of archiving objects associated with the one or more selected database tables, wherein the plurality of archiving objects include one or more archiving programs and define data related to a business object;

receive a selection of one or more data slice variants associated with the plurality of the archiving objects based on an attribute, wherein the one or more data slice variants associated with at least two archiving objects from the plurality of archiving objects are mutually exclusive;

rank the plurality of archiving objects based on dependencies between the plurality of archiving objects;

based on the ranking of the plurality of archiving objects, generate an archiving schedule including an archiving order and one or more data slice variants associated with the plurality of archiving objects; and display the archiving schedule on a computer generated user interface.

12. The system of claim 11, wherein the program code to rate the plurality of database tables based on the at least one of one or more parameters including the table size and the table growth rate, further comprises program code to:

determine a composite rating for one or more of the plurality of database tables based on the table size and the table growth rate.

13. The system of claim 12, wherein the processor further executes the program code to: display the composite rating and the dependencies between the plurality of archiving objects on a user interface.

14. The system of claim 11, wherein the processor further executes the program code to: execute archiving processes according to the archiving schedule.

15. The system of claim 11, wherein the program code to select the one or more database tables based on the rating of the database tables, further comprises program code to: select the one or more of the database tables from the plurality of database tables based on a threshold value of the composite rating.

* * * * *